United States Patent [19]

Goriachev et al.

[11] Patent Number: 5,464,513
[45] Date of Patent: Nov. 7, 1995

[54] METHOD AND APPARATUS FOR WATER DECONTAMINATION USING ELECTRICAL DISCHARGE

[75] Inventors: Vladislav L. Goriachev; Alexander N. Bratsev; Valeri N. Feduikovich; Philip G. Rutberg, all of St. Petersburg, Russian Federation; Hugh W. Greene, Somerville; Paul E. Chism, Jr., Decatur, both of Ala.

[73] Assignee: Scientific Utilization, Inc., Decatur, Ala.

[21] Appl. No.: 180,961

[22] Filed: Jan. 11, 1994

[51] Int. Cl.⁶ ........................................ C02F 1/46
[52] U.S. Cl. .................. 204/164; 204/242; 204/275; 588/204
[58] Field of Search ........................ 204/164, 242, 204/275; 588/204

[56] References Cited

U.S. PATENT DOCUMENTS

| | | | |
|---|---|---|---|
| 3,192,126 | 6/1965 | Fear | 196/46 |
| 3,223,747 | 12/1965 | Bohrer | 260/674 |
| 3,223,748 | 12/1965 | Bohrer | 210/748 |
| 3,498,457 | 3/1970 | Gough | 210/85 |
| 3,770,612 | 11/1973 | Gray et al. | 204/261 |
| 3,841,483 | 10/1974 | Overton | 210/87 |
| 3,922,224 | 11/1975 | Lewandowski | 210/223 |
| 4,169,029 | 9/1979 | Smirnov et al. | 204/149 |
| 4,655,909 | 4/1987 | Furuno | 210/90 |
| 4,758,319 | 7/1988 | Klinkowski | 204/182 |
| 4,761,208 | 8/1988 | Gram et al. | 204/95 |
| 4,917,785 | 4/1990 | Juvan | 204/164 |
| 4,957,606 | 9/1990 | Juvan | 204/164 |
| 4,986,906 | 1/1991 | Dadisman | 210/196 |
| 5,026,464 | 6/1991 | Mizuno et al. | 204/164 |
| 5,049,248 | 9/1991 | Muralidhara | 204/180 |
| 5,118,942 | 6/1992 | Hamade | 250/324 |
| 5,230,792 | 7/1993 | Sauska et al. | 210/97 |

*Primary Examiner*—John Niebling
*Assistant Examiner*—Arun S. Phasge
*Attorney, Agent, or Firm*—Waddey & Patterson; Mark J. Patterson

[57] ABSTRACT

A water decontamination method and apparatus uses a series of pulsed electrical arcs across electrodes placed within a water stream which passes through a decontamination module. Sufficient energy is delivered by a pulse power unit to the electrodes whereby lethal ultraviolet radiation and mechanical shock waves are created by the arcs within the decontamination module. A plurality of modules can be operated in parallel or in series to vary the capacity of the apparatus.

5 Claims, 4 Drawing Sheets

5,464,513

METHOD AND APPARATUS FOR WATER DECONTAMINATION USING ELECTRICAL DISCHARGE

Be it known that we, Vladislav L. Goriachev, Alexander N. Bratsev, Valeri N. Fediukovich, and Philip G. Rutberg, citizens of Russia, each residing in St. Petersburg, Russia, and Hugh W. Greene of Somerville, Ala. and Paul E. Chism, Jr. of Decatur, Ala., have invented a new and useful *"Method and Apparatus for Water Decontamination Using Electrical Discharge"*.

BACKGROUND OF THE INVENTION

The present invention relates generally to methods and equipment used in the purification and decontamination of water, and more particularly to a water purification method using electrical discharge within a water stream.

A significant amount of research and development has been undertaken in recent years towards environmental clean-up operations, and in particular to the purification and decontamination of ground water, waste water, and drinking water. The need for decontamination of water can vary from the continuous treatment of industrial waste water to dealing with one-time contamination of water pools or ponds at a single location. Accordingly, methods are needed which are feasible on both a large and small scale.

A variety of techniques have been used in the prior art to destroy or remove contaminating and toxic materials in water supplies. These include the use of shock waves created by ultrasonic vibrations and exposing the water to ultraviolet radiation. Electricity has also been employed as a decontamination agent, such as by introducing positively charged ions into a water stream to cause coagulation and separation of particles, and by the passing of electric current within a fluid chamber whereby the current flow between the anode and cathode has a toxic effect on microorganisms nearby.

Chlorination is well known and effective in limiting bacteria and microorganisms but has little effect on organic chemicals. Conversely, activated carbon filters can remove organic chemicals but such filters are extremely costly and require regular maintenance.

The use of ozone injection can also be effective. However, to be efficient, an ozonation facility must be extremely large. Therefore, its cost and size renders it unsuitable for use, for example, to clean up small contaminated ground water and waste water sites. Hydrogen peroxide injection systems can also be used but are not preferred because of the effects of inorganic contamination and because of the high costs associated with such systems.

What is needed, then, is a water purification and decontamination method which can effectively destroy or remove a variety of organic materials and chemical toxins at relatively low cost, which does not require the addition of other chemicals or further processing of the contaminated water, and which can be adapted for use in both large and small scale operations. Such a method is presently lacking in the prior art.

SUMMARY OF THE INVENTION

One object of the present invention is to provide a method of water decontamination which is effective both on bacteria and other microorganisms as well as on organic chemicals.

Yet another object of the present invention is to provide for a method and apparatus of water purification which can both be cost effective and efficient whether being operated on a large or small scale.

A further object of the present invention is to employ a water purification method which concurrently implements several different modes of decontamination actions but without adding complexity to the apparatus itself.

To achieve these and other objectives, the method of the present invention uses a synergistic combination of ultraviolet radiation, pulsed mechanical shock waves, and ionization of the water stream, as decontamination and purification actions within the water to be treated. The water to be decontaminated is directed through one or more decontamination modules arranged in series or parallel. A pair of electrodes extend transversely across and through a cavity within the module, defining therein an arc gap or electric discharge area. Contaminated water is introduced into the cavity and module through an intake port where it passes through or proximate to the discharge area. A pulse power unit delivers a rapid sequence of arc inducing electrical pulses across the electrodes, thereby producing a series of electric discharge arcs across the discharge area between the electrodes. The arcs are of sufficient energy whereby a plasma inducing arc is sustained through the water across the electrodes, generating lethal levels of ultraviolet radiation as well as mechanical shock waves having the capacity of directly killing microorganisms and weakening others. Further, molecules of water proximate to the discharge area are broken down into excited radicals, including hydroxyl ions and free oxygen, which combine with organic chemicals to eliminate them from the water stream.

DESCRIPTION OF THE PREFERRED EMBODIMENT

Figure 1:
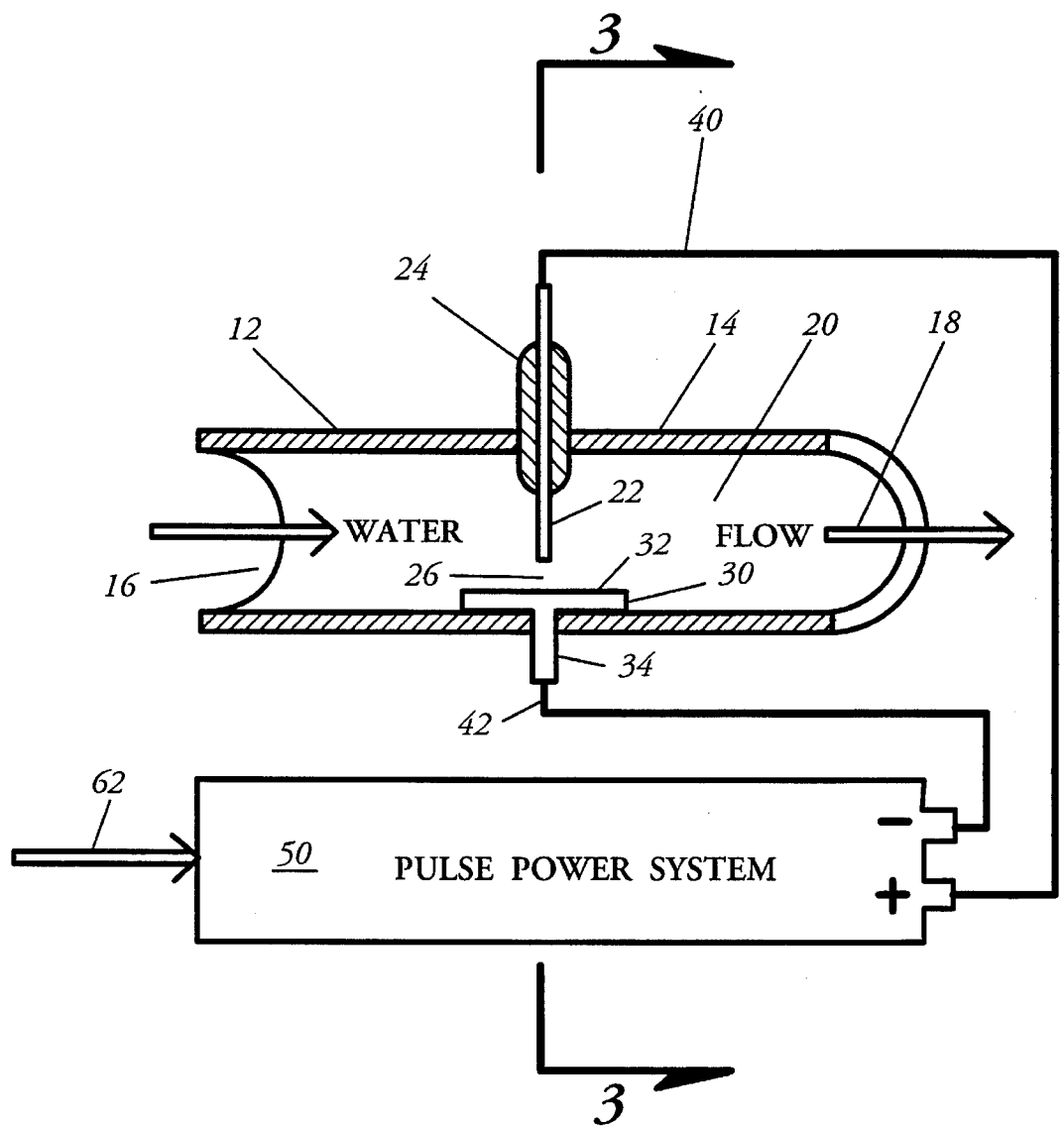
FIG. 1 is a schematic representation of the water decontamination apparatus of the present invention with a decontamination module shown in a cut-away view.
Figure 2:
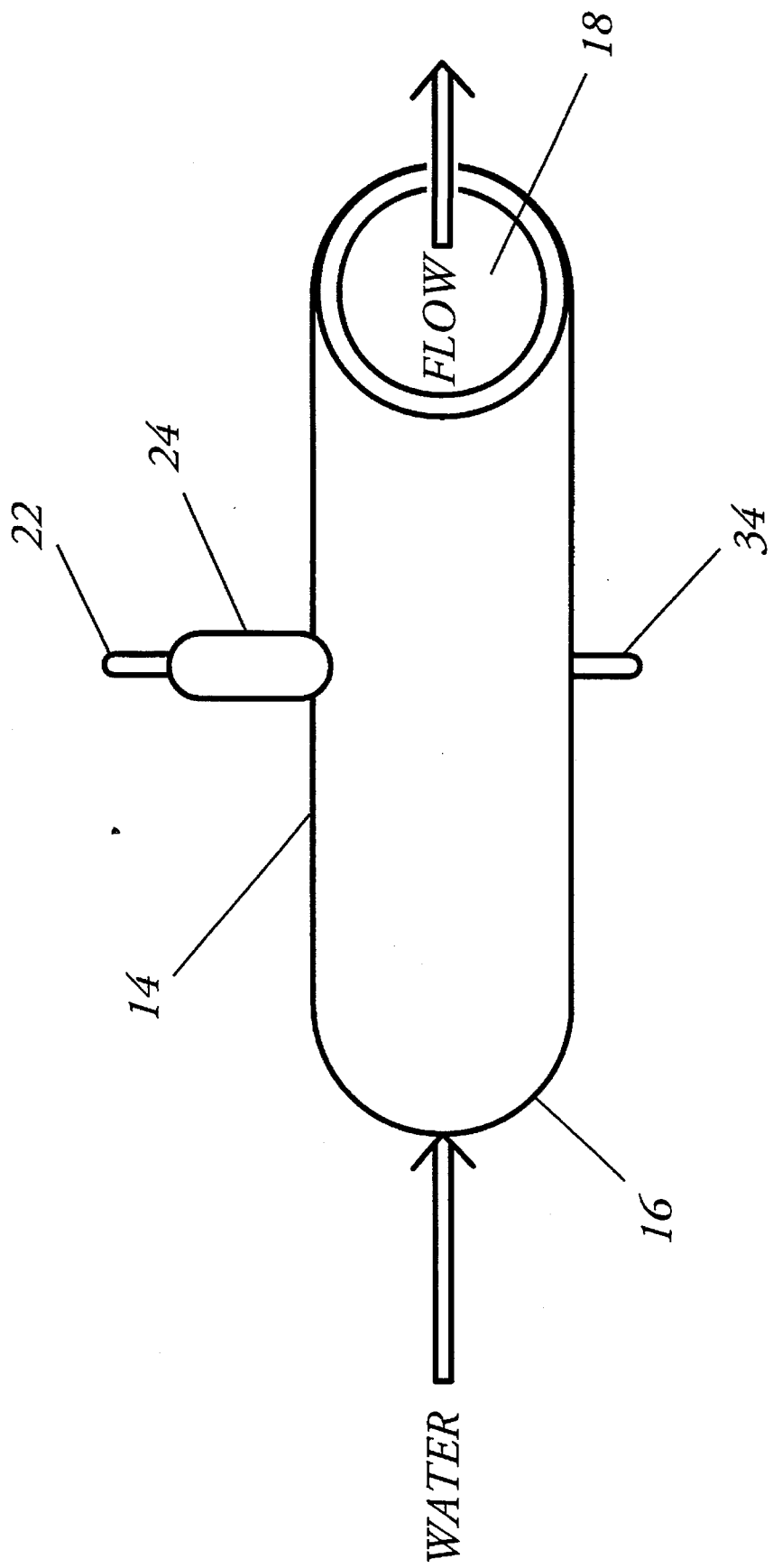
FIG. 2 is cutaway plan view of the decontamination module, showing the geometry of the electrodes.

The water decontamination method of the present invention uses three distinct modes of purification and decontamination of water, which combine in a synergistic manner to remove or destroy organic materials and chemical toxins. The event which initiates each of these distinct decontamination modes is a series of pulsed electrical arcs which are produced within the water stream. Using a discharge voltage of between 10 kV to 50 kV, with a peak arc current of 30A, a plasma effect is created in the arc discharge area. The immediate result is a localized temperature of 10,000 to 50,000 degrees K. and localized plasma pressures of between 100 to 1000 MPa. As a first consequence of the discharge, the arc itself generates high levels of ultraviolet radiation which is destructive of many living organisms found in water streams. Second, the high temperature causes a rapid expansion and then cooling of the ambient water, producing a mechanical shock wave within the decontamination unit and resulting in both immediate destruction of many bacteria and microorganisms, as well as the breaking down of protective shells and membranes of others, thereby exposing them to ultraviolet radiation or other lethal effects. Thirdly, the electrical discharge breaks down the water itself into hydrated electrons, ions, and excited free radicals, including H, OH, $HO_2$, and $O^+$. These radicals directly attack the bacteria and viruses and then combine with the organic chemicals to eliminate them, similar to the previously mentioned hydrogen peroxide and ozone injection systems.

Thus, the significant event in the method is the creation of a high energy electrical arc within the water. An apparatus which will create such an arc is shown generally on FIG. 1. The decontamination and purification effects take place within one or more decontamination modules 12 through which the ground, waste, or drinking water passes during the decontamination process. In a preferred embodiment, module 12 has a generally cylindrically shaped wall 14 which, in conjunction with water intake port 16 and water discharge port 18, will define therein a fluid containing decontamination cavity 20. Preferably, decontamination module 14 will be constructed of Lexan® plastic material, with an inside diameter of approximately 3 cm.

Mounted transversely on opposing sides of wall 14 are arc inducing electrodes in the form of an anode 22 and cathode 30. Anode 22, preferably made of tungsten, will have a generally cylindrical shape, approximately ⅛ inch in diameter, terminating in a point. Anode 22 will be supported as it enters and passes through wall 14 by anode holding fixture 24, made of Teflon® PTFE, and mechanically adapted for easy removal of anode 22 and for adjusting its position within cavity 20.

Cathode 30 will have a generally rectangular arcing plate 32 which is substantially longitudinally aligned with and proximate to the inner surface of wall 14. Extending perpendicularly from the outside or wall contacting surface of arcing plate 32 is a terminal portion 34 of cathode 30. A fluid retaining seal (not shown) will be placed around terminal 34 in a conventional manner to prevent the release of contaminated water from within module 12.

Figure 3:
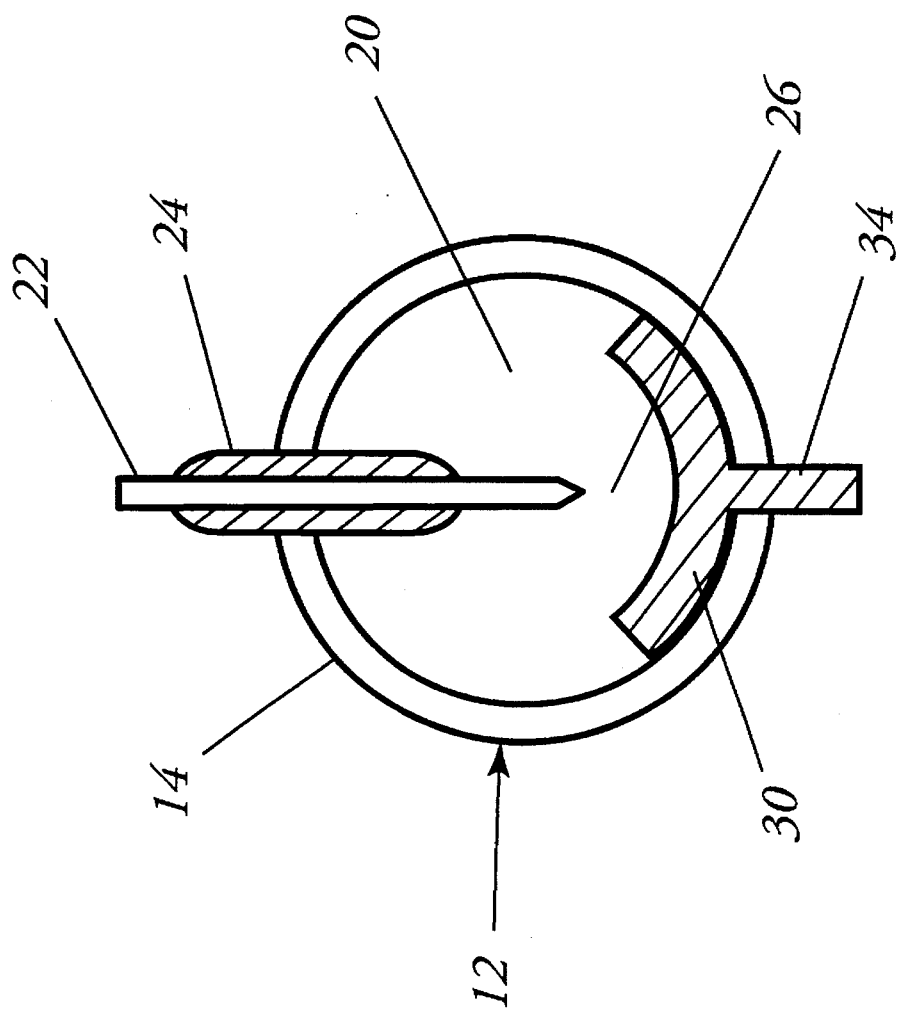
FIG. 3 is an end view, looking through the decontamination module of the apparatus of the present invention.

As seen on FIGS. 1 and 3, an arc discharge area 26 is defined between the flat surface of arcing plate 32 and the pointed end of anode 22. The length of this discharge area, or distance between the pointed end of anode 22 and the inward facing surface of arcing plate 32, is critical to the proper operation of the decontamination apparatus. The spacing should be maximized for optimum flow rate, consistent, however, with the ability to produce and sustain a reliable electrical discharge and arc between anode 22 and cathode 30. In a preferred embodiment of the invention, the length of discharge area 26 will be approximately 1.0 cm.

Anode 22 is the only pan of the apparatus which requires periodic replacement. Therefore, use of a highly durable material in manufacturing the anode is important. Metals found acceptable for use in manufacturing anode 22 include tungsten thorium alloy and chromemolly alloy.

Cathode 30 can be made of any durable metal which is suitable for long-term operation, stainless steel, for example. Discharge plate 32 of cathode 30 should be approximately 2 cm by 2 cm by 2 cm, with a thickness of 0.2 cm.

To create an arc between anode 22 and cathode 30, anode 22 is connected to pulse power unit 50 by means of positive cable 40. A negative cable 42 is connected also from terminal portion 34 of cathode 30 to the negative side of pulse power unit 50.

Figure 4:
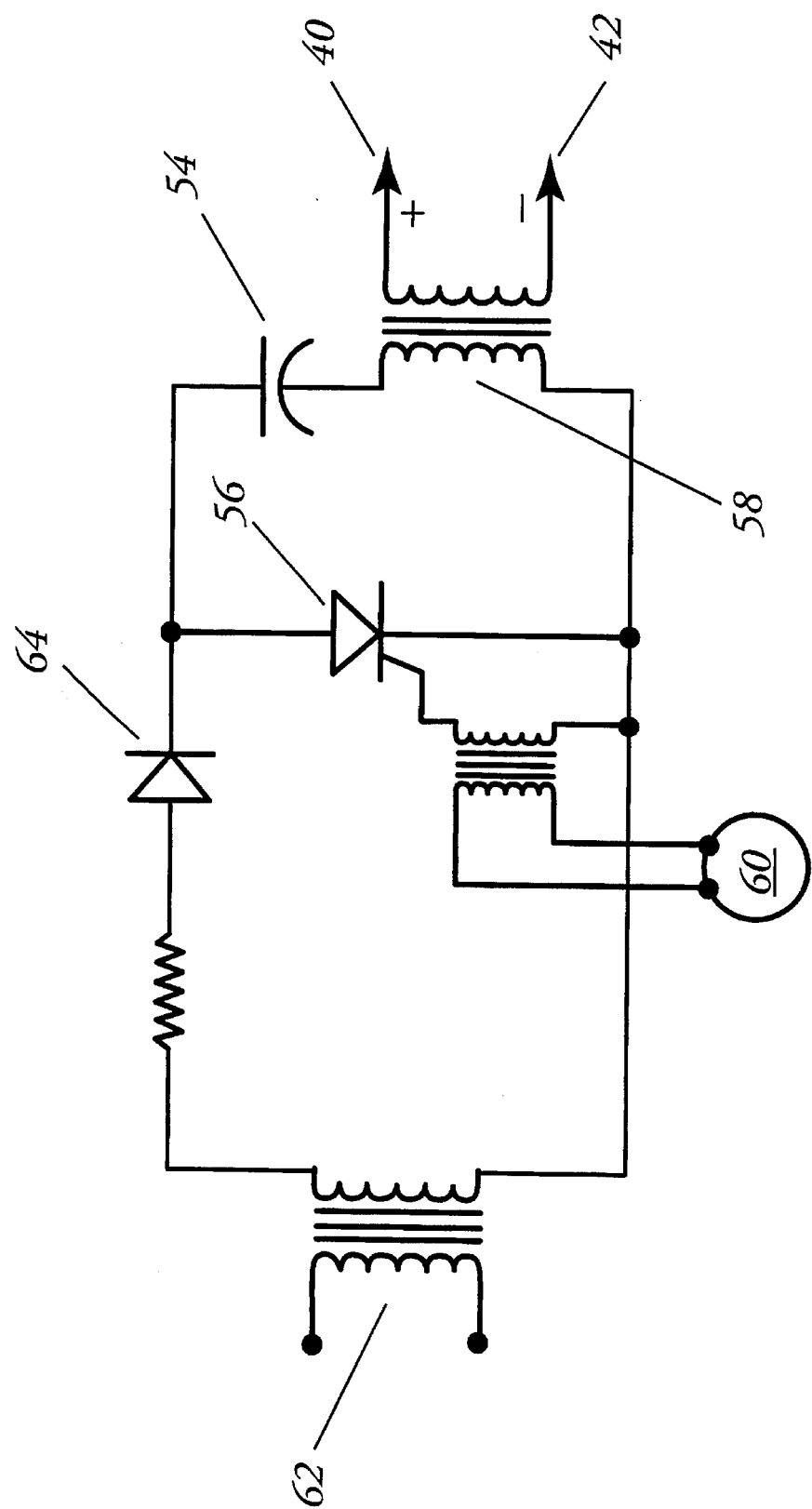
FIG. 4 is a schematic diagram of the pulse power unit of the present invention.

To achieve the objective of repetitive generation of shock waves within decontamination module 12, as a consequence of generation of the arc, means for pulsing the arc are used. Looking now at FIG. 4, further detail is provided regarding the design of pulse power unit 50. Preferably, pulse power unit 50 will be of the capacitive discharge type, having a discharge capacitor 54 with a capacity of forty microfarads and rated at 3,500 volts. Capacitor 54 is discharged by means of high power semiconductor switch 56, which is designed and selected such that it can discharge the capacitor into output pulse transformer 58 in one microsecond.

In order to produce a sufficiently high energy electrical arc at discharge area 26, pulse transformer 58 must be capable of producing a 40,000-volt, 30-amp pulse at anode 22, based on a 1,500-volt, 1,100-amp pulse from discharge capacitor 54. Thus, in the preferred embodiment, semiconductor switch 56 must receive a triggering signal from electronics timing board 60, which contains circuitry capable of producing between one and sixty triggering signals per second. Discharge capacitor 54 is charged to 1,500 volts DC in several milliseconds by first stage transformer and rectifier unit 64, which is connected to a conventional 120-volt power line 62.

In one preferred embodiment of the apparatus, timing board 60 will cause the production of thirty arcs per second across discharge area 26 at a peak power level of 1.2 megawatts. The pulse width of the arcing signal is approximately five microseconds, providing an energy level of approximately 7.0 Joules per pulse with an arc gap or discharge area 26 distance of approximately of 1.0 centimeters.

The flow rate of water through module 12 can be adjusted to varying levels, depending on the energy requirements per volume of water for a preferred amount of decontamination and purification effects. In one preferred embodiment, an energy density of 1.0 $J/cm^3$ of water will provide adequate decontamination, thereby allowing a flow rate of approximately of twelve liters per minute through module 12.

It will be apparent to those skilled in the art that the dimensions and volume of module 12 can be proportionally adjusted in accordance with the type of water to be purified and the needed flow rate. Further, to increase decontamination capacity, a plurality of modules 12 can be concurrently operated in parallel, from a single contaminated water supply emptying into a unitary discharge. Also, to enhance the amount of de, contamination effects, a plurality of modules 12 can be operated in series, whereby purified water leaving the discharge port 18 of the first module 12 will then feed immediately into the intake port 16 of a second module 12, and so on.

Based on tests of a prototype system implementing the methods and apparatus described herein, purification level of 99.5%, suitable for drinking water, can be achieved using an energy density of 3.5 $J/cm^3$ or 1 $KWH/M^3$. To meet standard environmental requirements, that is to achieve a purification level adequate to allow release of the treated water into the environment, a power density of 0.3 $KWH/M^3$ is adequate.

Further testing of a preferred embodiment for the removal of common organic chemical contaminants showed that reduction of such contaminants occurs at an arc energy level of between 10–30 $J/cm^3$ occurs, whereby a 90 to 95 % reduction in contaminants was obtained for pesticides from an initial concentration of 0.1 grams per liter, for hydrocarbons from 0.1 to 40 grams per liter, and for oil products from between 0.2 and 20 grams per liter.

Thus, although there have been described particular embodiments of the present invention of a new and useful method and apparatus for water decontamination using electrical discharge, it is not intended that such references be construed as limitations upon the scope of this invention except as set forth in the following claims. Further, although there have been described certain dimensions and operational parameters used in the preferred embodiment, it is not intended that such dimensions be construed as limitations upon the scope of this invention except as set forth in the following claims.

What we claim is:

1. A method of water purification comprising the steps of:
   a. directing the water to be purified through a decontamination module; and
   b. generating by a pulse power unit means an electric discharge arc within said decontamination module, said pulse power unit means comprising a semiconductor switch, a discharge capacitor, and a pulse transformer having an input and output;
   c. operating said semiconductor switch and said discharge capacitor at an applied operating voltage and using said semiconductor switch to discharge said discharge capacitor to produce an pulse input signal at said input of said pulse transformer, thereby generating a pulse output signal at said output of said pulse transformer, the applied operating voltage being from 375 to 3500 volts, the pulse input signal being from 375 to 3500 volts to give the pulse output signal having a peak voltage of 10,000 volts to 50,000 volts.

2. The method of claim 1 wherein said arc is periodically interrupted to create a series of pulsed electric discharge arcs within said decontamination module, the series of pulsed arcs having a pulse frequency of 30 to 60 pulses per second.

3. The method of claim 2 wherein the pulse output signal has a peak current of approximately 30 amperes.

4. A water decontamination apparatus comprising:
   a. a decontamination module;
   b. means for directing a flow of water through said decontamination module;
   c. at least one pair of electrodes fixed within said module; and
   d. power unit means for generating an arc across said electrodes and within the water, said power unit means comprising a pulse transformer means for providing an output signal of 10,000 to 50,000 volts to said electrodes, a discharge capacitor means for supplying an input signal of 375 to 3500 volts to said pulse transformer, semiconductor switch means for discharging said discharge capacitor, and a first stage transformer and rectifier means for supplying a DC operating voltage of 375 to 3500 volts to said discharge capacitor means and to said semiconductor switch means.

5. The apparatus of claim 4 where said power unit further comprises timing board means for interrupting said arc, thereby producing a continuous series of pulsed arcs across said electrodes at a pulse frequency of 30 to 60 pulses per second.

* * * * *